(No Model.)
2 Sheets—Sheet 2.
W. A. TUCKER.
CAPSULE CUTTER.
No. 305,867. Patented Sept. 30, 1884.
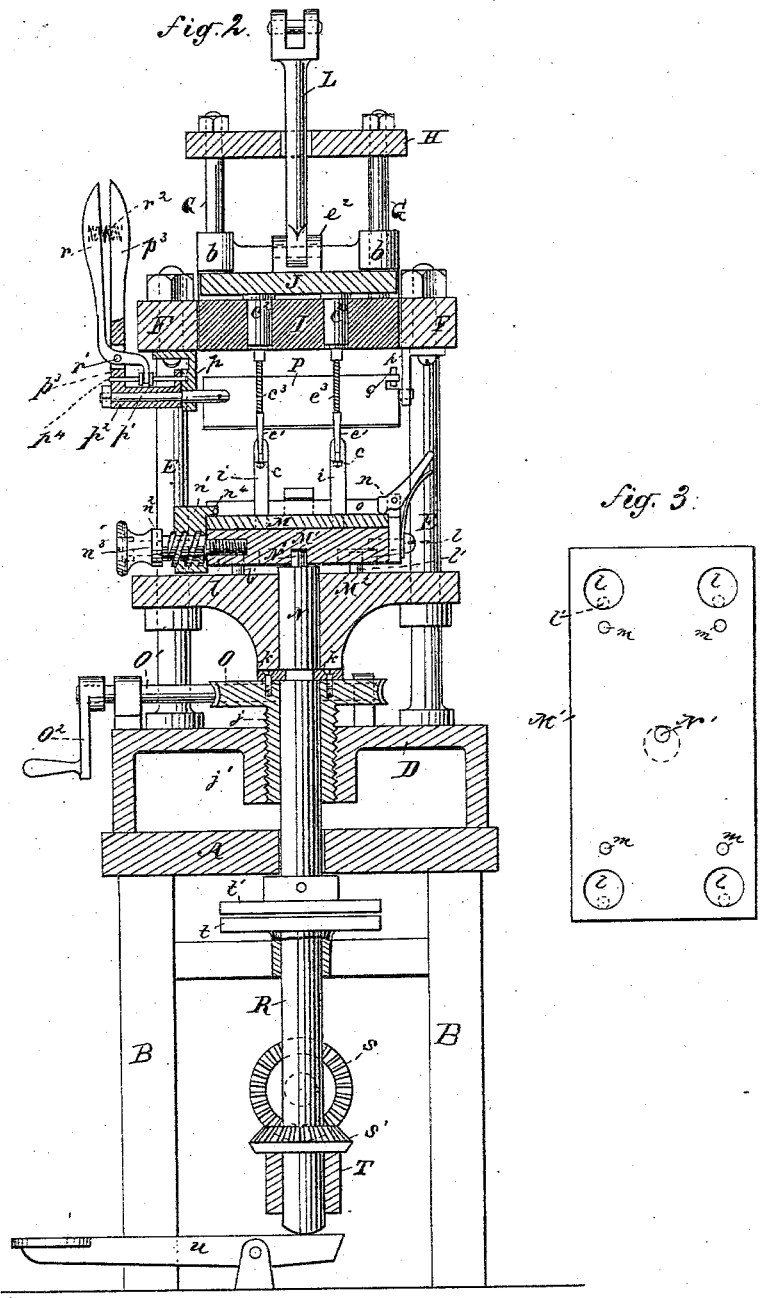
Witnesses:
Henry Eihling
A. M. Vermilye
Inventor
William A. Tucker
by J. Fitch
his attorney

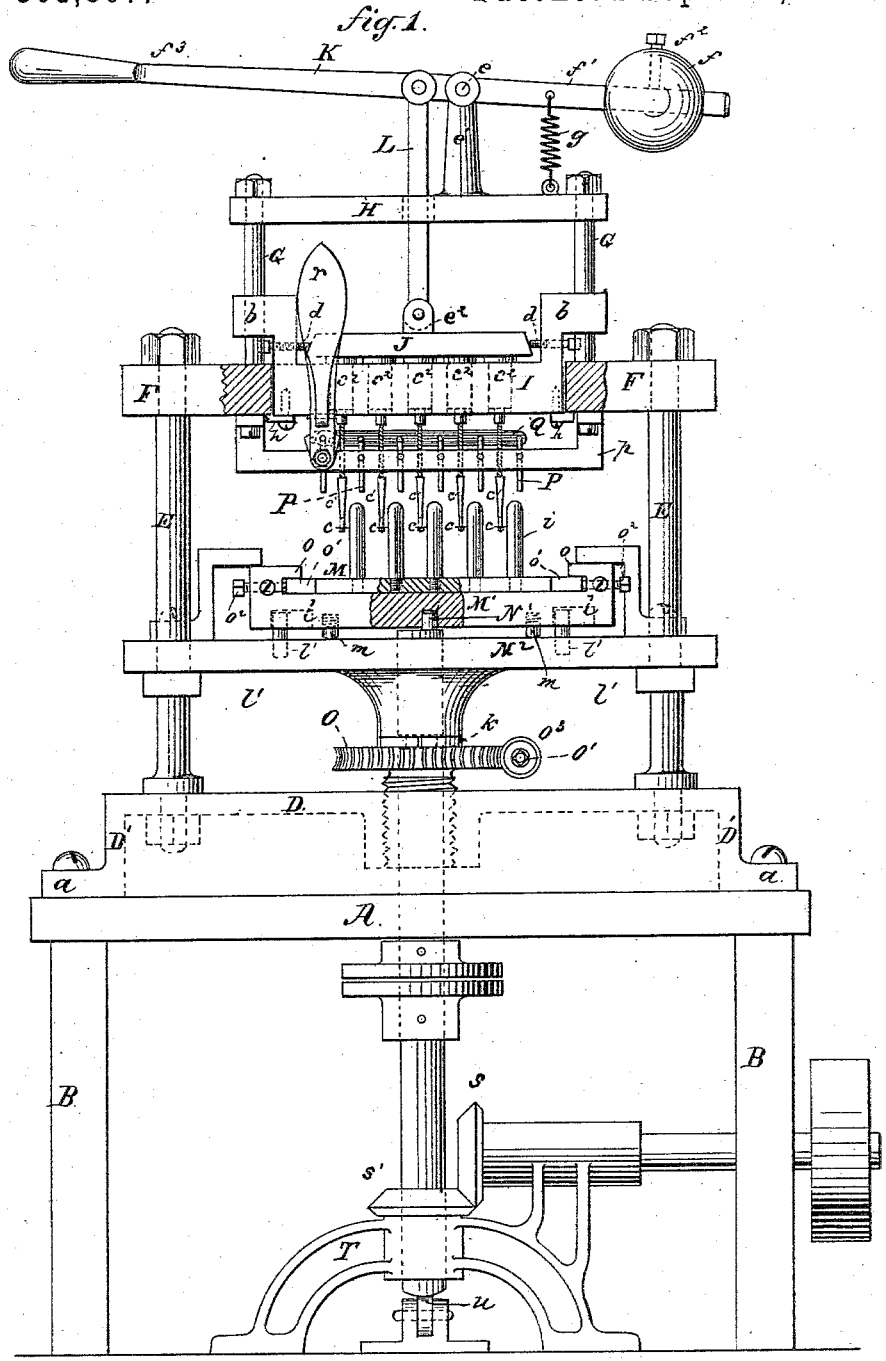

UNITED STATES PATENT OFFICE.

WILLIAM A. TUCKER, OF NEW YORK, N. Y.

CAPSULE-CUTTER.

SPECIFICATION forming part of Letters Patent No. 305,867, dated September 30, 1884.

Application filed July 20, 1883. (No model.)

*To all whom it may concern:*

Be it known that I, WILLIAM A. TUCKER, of the city of New York, in the county and State of New York, have invented an Improvement in Machines for Cutting off Gelatine Capsules, of which the following is a specification, reference being had to the accompanying drawings, forming part of the same, in which—

Figure 1 is a front elevation, and Fig. 2 a side elevation, of a machine embodying my invention; and Fig. 3 is a detail view herein described.

My invention relates to a machine designed to cut or trim to desired lengths gelatine capsules on the mold-pins on which the capsules are formed; and it consists in the devices and combinations of devices hereinafter described and claimed.

The frame upon which the working parts are mounted consists, as shown in the drawings, of the following parts: A table or plate, A, supported on pillars B at its four corners, which stand on a base, C. On this table is placed a plate, D, with downwardly-extending sides D′, at the lower edges of which are outwardly-projecting flanges or ends $a$, through which pass screws to secure the said plate to the table A.

Resting on and secured to the plate D are four pillars, E—one at each corner—which support the plate F, upon which stand the four pillars, G, which support the plate H.

The several parts named are secured fixedly together.

I is a plate having at its four corners projections $b$, the said projections being above the level of the upper face of the said plate.

In the plate F is a large central opening, into which the plate I may descend. The plate I carries the cutters $c$, the number of which will correspond to the number of molds used in the machine. The cutters are sharp-edged disks that are pivoted to revolve on the free ends of downwardly-projecting arms, the upper ends of which are fixed in head bolts or shafts $c^2$. The said arms are preferably made elastic, being composed of the stems $c'$ and the volute springs $c^3$, said springs being formed of narrow strips of steel wound spirally tightly upon themselves, so that each spiral laps over the adjacent spiral. I do not, however, limit myself to this volute form of spring. Solid spring wire or rods may be used, if preferred. Nor do I intend here to claim the volute form of spring in this connection, reserving such claim for a separate application for a patent which it is my purpose to make. The head-bolts $c^2$, provided with flanged heads, are set down into holes provided for them in the plate I, and are held in place by a plate, J, that is laid down upon their heads, and secured in place by set-screws $d$. The edges of the said plate J, against which the said set-screws impinge, being inclined, as shown in Fig. 1, the action of the screws will be to force the said plate down upon the heads of the shafts $c^2$. By this arrangement the several shafts $c^2$, carrying the cutters, may be conveniently and readily removed from or placed in the plate I.

In Fig. 1 the front portion of the plate F is cut away in order to bring into view the plate I.

K is a lever pivoted at $e$ to a standard, $e'$, that rises from the plate H.

L is a connecting-bar pivoted at the upper end to said lever K, and at the lower end to an eye, $e^2$, secured to the center of the plate J, the said bar passing through an opening in the plate H.

$f$ is a weight adjustably held on the short arm $f'$ of the lever K, and made adjustable by set-screw $f^2$. In addition to this weight, I preferably employ, also, a spring, $g$, connected at the upper end to the lever K, and at the lower end to the plate H, which acts in conjunction with the weight $f$ to depress the said short arm $f'$ of lever K. Stops $h$ are secured upon the under face of the plate I—one on each end—which stop against the under face of the plate F and prevent the plate I from rising above it. The weight $f$ and spring $g$ act to hold the plate I in a fixed position, with the said stops against the plate F. By depressing the long arm $f^3$ of the lever K the plate I may be carried downward a short distance until the sleeves $b$ strike against the upper face of the plate F. This motion is provided for the purpose of breaking away the chip or waste of the capsule which has been cut off by the cutters, the depression of the said plate I carrying down, of course, the cutters which break and carry away the chip, the cutters being, however, in a fixed position, as before described, at all times except when carried down to break off the chip.

M is the ordinary mold plate or bed, carrying secured to it a series of upwardly-projecting capsule-molds, $i$, set in said plate so as to leave spaces between them into which the cutters may be introduced.

M' is a carrying-plate, which rests upon the bed-plate $M^2$, which is sleeved at its corners upon the pillars E.

N is a revolving shaft, which is journaled at the upper end in the plate $M^2$, and at the lower end in the plate A.

O is a worm-gear, which rotates loosely on the shaft N, and has a downwardly-projecting sleeve, $j$, which passes through a central opening in the table or plate D, and has on its outside a screw-thread, which works in a female screw-thread in the said opening and the inside of a downwardly-extending boss, $j'$, connected to said plate D. Immediately above the said gear O an annular groove is cut in the said shaft N, into which is fitted a collar, $k$, which is made fast by screws to the said gear O, the said collar being made in two parts to enable it to be put in place. A worm, $O^3$, on the shaft O' works in the said gear O, and is operated by a crank, $O^2$.

On the upper end of the shaft N is an eccentric crank-pin, N', which enters and works in a corresponding hole in the plate M'.

At each of the four corners of the plate M' is a circular opening or recess, (shown in dotted lines at $l$ and in full lines in Fig. 3, which is an under face view of the plate M,) into which openings a pin, $l'$, secured in and projecting upward from the plate $M^2$, enters. Said pin is of less diameter than the recess by double the throw of the crank-pin N'. Now, it is evident that when the shaft N is rotated the center of the plate at which the hole in which the crank-pin N' works will be carried around in a circle, and the plate being held at its corners, so as to cause them to rotate in corresponding circles, by means of said pins $l'$, working in the said recesses $l$, the said molds $c$ will each be carried around in corresponding circles.

In order to lessen friction between the plate M' and plate $M^2$, several steel pins, $m$, are inserted in the under face of the former, which rest down and move upon the upper face of the latter.

On each side of the carrying-plate M' is an upwardly-projecting flange, $o$, on the inner face of which is cut a groove, in which is placed a guide-bar, $o'$, which is adjustable by set-screws $o^2$.

The mold-plate is put into the machine by being slid in between said guide-bars from the front, and is held down upon the carrying-plate M' by the spring-dog $n$, which is pivoted on the said flange at the rear edge. At the front edge the said plate M is held down by means of the flanged nut $n'$, which works on a screw-sleeve, $n^2$, which is sleeved onto the shaft $n^3$, that is secured centrally in the edge of the carrying-plate M'. This nut $n'$ has on its upper side an inwardly-projecting flange, $n^4$, which, when the nut is screwed up, projects over and upon the front edge of the plate M and holds it down onto the carrier-plate M'. When the said nut is run back by turning the sleeve $n^2$, the flange $n^4$ is drawn off from the plate M, when the said nut may be turned over so that its upper side may lie below the lower face of the plate M', which may then be removed or replaced. In fact, when the said nut is run back against the shoulder at the end of the screw-thread on the sleeve $n^2$, a further turning of the said sleeve will itself carry the said nut over on its side. There is provided a series of rock-bars, P, which are pivoted in brackets $p$, which depend from the plate F. These rock-bars are connected together by a rod, Q, to which each of the said rock-bars is pivoted at one end at its upper edge, so that when one of the said rock-bars is rocked on its pivot all the others will be rocked by means of the said rod Q. The axial shaft of one of the said rock-bars is extended outward beyond the front of the machine, as seen at $p'$, Fig. 2. On this is secured a sleeve, $p^2$, to which is connected a crank-lever, $p^3$, the sleeve being made fast to said axial shaft $p'$.

$p^4$ is a rod which slides back and for thin holes made in ears that project upward from either end of the said sleeve; and holes are made in the front face of the front bracket, $p$, into which the inner end of the rod $p^4$ may enter and lock the rock-bars in position.

$r$ is an elbow-lever, pivoted at $r'$ on the crank-lever $p^3$, the lower end being forked onto the rod $p^4$, with a collar on either side, as shown, and a spiral spring, $r^2$, acts to press the rod $p'$ into engagement with the said holes in bracket $p$, while the pressing of the upper ends of $r$ and $p^3$ together will disengage the rod from the said lever. The purpose of these rock-bars P is to force the cutter-stems and cutters out of the perpendicular, and permit the pins on the plate M to be introduced into the machine into range with the cutters, a rock-bar being provided to operate upon each line of cutters.

In this machine it is intended that the dimensions of the capsules shall be determined by the length and diameter of the molds, having reference to the vertically-fixed position of the cutters. A slight vertical adjustment is given to the carrying-plate M' by means of the worm-gear before described, in order to accurately adjust the molds to the knives, which are liable to get out of the exact fixed adjustment by reason of wear.

In operating this machine the molds are dipped properly into the gelatine solution, which is allowed to become suitably dry upon the mold. The carrying-plate M' being brought to its limit of motion, either to the right or left hand side of the machine, the rock-bars are rocked on their axes, to push the cutters a little to one side, and the mold-plate is then slid into its place on the carrying-plate and locked in position, as before described. The rock-bars P are then rocked, so as to release the cutters from their action, and they are thereby brought into contact with the capsules on the molds. Motion is then given to the shaft N, whereby, as before described, movement will be communicated to the mold-plate M, which will carry the molds each around the cutter with which it is in contact and trim each capsule to the proper length. Then, to break away and remove the waste or chip, the motion of the shaft N is continued with a short intermittent movement, and at each intermission the long arm of the lever K is depressed and elevated by the operator, thus first carrying down and then raising the cutters while they are still in contact with the molds, and thereby cutting and carrying away the chip.

I have described the cutters as circular; but they may be angular with straight sides or elliptical. In fact, I find that the former are an improvement upon the circular rotary cutter, the slight dragging cut which is made with them acting to more completely sever the chip from the capsule, and leave on the latter a smoother edge; but I do not intend here to claim either of said forms which gives the dragging cut, reserving them for a separate application for a patent.

Motion may be given to the shaft N in any suitable way, preferably by a shaft, R, driven by power through gears $s$ $s'$, the latter being feathered onto the said shaft, the shaft being journaled near the lower end in the box T, through which it may slide vertically, at the upper end of the shaft R, there being a friction-disk, $t$, with a corresponding disk, $t'$, on the lower end of the shaft N. By means of a foot-lever, $u$, the shaft R may be raised at pleasure to make engagement between the two disks $t$ $t'$.

I have described devices by which the motion is given to the mold-plate M, whereby each of several molds $i$ is carried round one of the cutters $c$; but I do not intend to limit myself to the precise devices described. Any known suitable device may be used.

I regard the plate M', provided with the openings $l$, the shaft N, provided with the crank-pin N', working in a central opening in said plate, and the fixed pins or studs $l'$, working in the openings $l$, as together constituting a novel mechanical movement, and patentable as a new invention; but I do not here claim the same separate from their combination with the described capsule-cutting machine, reserving the same for a separate application for a patent which it is my intention to make.

What I claim as my invention, and desire to secure by Letters Patent, is—

1. In a capsule-cutting machine, the combination of the series of cutters $c$, mounted on arms that are held at their upper ends in fixed positions, the series of molds $i$, fixed in the mold-plate M, the carrying-plate M', and driving-shaft N, with the described intermediate devices, whereby motion is communicated from said shaft to plate M, which will carry the said several molds around the said respective cutters, all as and for the purpose described.

2. In a capsule-cutting machine, the combination of the series of cutters $c$, mounted on arms, the flanged headed shafts $c^2$, to which said arms are attached at their upper ends, the plate I, provided with holes in which said shafts are placed, the plate J, and set-screws $d$, whereby the shafts $c^2$ are held in place, all as and for the purpose described.

3. In a capsule-cutting machine, the combination of the series of cutters $c$, mounted on spring-arms, with the series of rock-bars P, pivoted together as described, and the crank-lever $p^3$, connected to the axial shaft $p'$ of one of said rock-bars, all as and for the purpose described.

W. A. TUCKER.

Witnesses:
  A. S. FITCH,
  A. G. N. VERMILYA.